(12) United States Patent
Arseneaux et al.

(10) Patent No.: US 7,830,055 B2
(45) Date of Patent: Nov. 9, 2010

(54) HYBRID TOUCHDOWN BEARING SYSTEM

(75) Inventors: James Arseneaux, Westford, MA (US); Jimpo Wang, Tyngsboro, MA (US)

(73) Assignee: Beacon Power Corporation, Tyngsboro, MA (US)

( * ) Notice: Subject to any disclaimer, the term of this patent is extended or adjusted under 35 U.S.C. 154(b) by 316 days.

(21) Appl. No.: 11/904,590

(22) Filed: Sep. 28, 2007

(65) Prior Publication Data
US 2009/0085419 A1   Apr. 2, 2009

(51) Int. Cl.
*H02K 7/09* (2006.01)
(52) U.S. Cl. .......................... 310/90.5; 310/74; 310/90
(58) Field of Classification Search .................. 310/74, 310/90, 90.5
See application file for complete search history.

(56) References Cited

U.S. PATENT DOCUMENTS

| | | | |
|---|---|---|---|
| 5,477,094 A | 12/1995 | Lamb | |
| 5,588,754 A | 12/1996 | Miller | |
| 5,614,777 A * | 3/1997 | Bitterly et al. | 310/74 |
| 5,789,825 A * | 8/1998 | Selfors et al. | 290/52 |
| 6,262,505 B1 | 7/2001 | Hockney et al. | |
| 6,491,441 B2 * | 12/2002 | Vignotto et al. | 384/559 |
| 6,566,775 B1 * | 5/2003 | Fradella | 310/90.5 |

OTHER PUBLICATIONS

PCT search report and written opinion dated Feb. 12, 2009 for international application No. PCT/US 2008/013144.

* cited by examiner

*Primary Examiner*—Quyen Leung
*Assistant Examiner*—David W. Scheuermann
(74) *Attorney, Agent, or Firm*—Pritzkau Patent Group, LLC

(57) ABSTRACT

Upon operation, flywheel assemblies sand other such rotational mechanisms are released by mechanical backup bearings, which then normally remain disengaged until shutdown as the flywheel assembly is levitated by the axial magnetic field. However, either due to over heating of bearings, power failure or other stimuli, flywheels often suffer a phenomenon deemed as touchdown down from the levitation state. During this touchdown event, flywheels inherently lose rotational momentum, thus ceasing to generate and release power and often cause damage to components as well as casing. Enhancements developed herein, through the introduction of the instant secondary hybrid touchdown bearing system, allow flywheels and other such systems to retain rotational momentum and continue generation of energy. Further, the instant system negates damage to system components, as well as bearing wear.

7 Claims, 3 Drawing Sheets

HYBRID TOUCHDOWN BEARING SYSTEM

FIELD OF THE INVENTION

Figure 1:
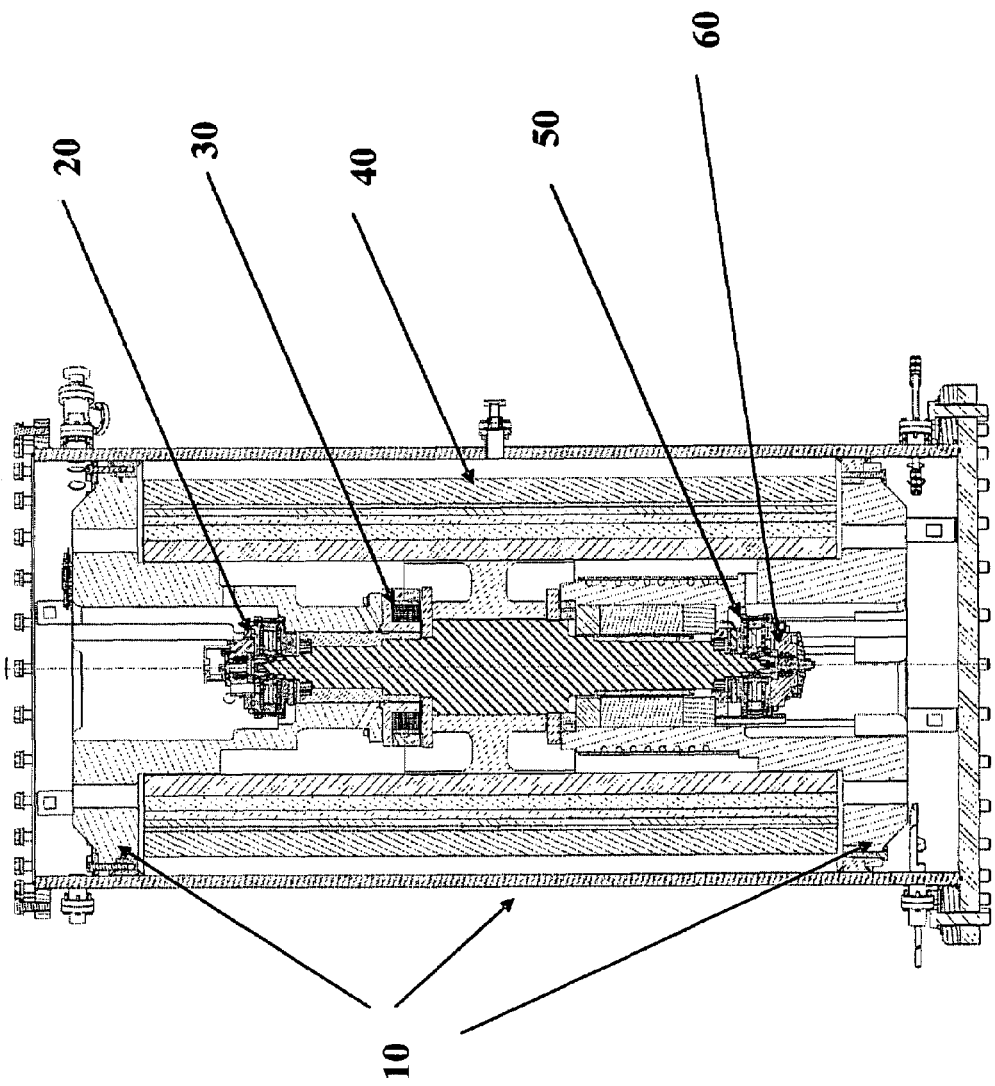

The present invention relates generally to flywheel driven power storage systems and particularly to enhancements developed for bearings, secondary or back up bearing systems relied upon during failure modes in order to sustain less bearing wear and impact damage and evince stronger recovery from power loss.

REFERENCES

In general within the art, descriptions of flywheel driven power storage systems and their various related elements can be found in U.S. Pat. No. 5,614,777 set forth by Bitterly et al; U.S. Pat. Nos. 567,595, 5,708,312, 5,770,909, and 58,644, 303 by Rosen et al; U.S. Pat. Nos. 3,860,300 and 4,147,396 by Lyman; U.S. Pat. Nos. 3,791,704 and 4,088,379 by Perper; U.S. Pat. No. 5,627,419 by Miller; U.S. Pat. No. 4,910,449 by Hiyama et al: U.S. Pat. No. 5,760,510 by Nomura et al: U.S. Pat. No. 5,777,414 by Conrad; U.S. Pat. No. 5,319,844 by Huang et al; U.S. Pat. No. 4,444,444 by Benedetti et al; U.S. Pat. No. 5,844,339 by Schroeder et al; U.S. Pat. Nos. 5,495, 221, 5,783,885, 5,847,480, 5,861,690, and 5,883,499 by Post; U.S. Pat. No. 5,705,902 by Merritt et al; U.S. Pat. Nos. 5,044, 944 and 5,311,092 by Fisher; U.S. Pat. Nos. 5,107,151 and 5,677,605 by Cambier et al; and U.S. Pat. No. 5,670,838 by Everton; plus U.S. Pat. Nos. 3,969,005, 3,989,324, 4,094, 560, and 4,141,607 by Traut; and U.S. Pat. No. 4,799,809 by Kuroiwa.

BACKGROUND OF INVENTION

This invention relates to electric power storage, through power interface electronics and electromechanical energy conversion, in the inertia of a spinning flywheel, and by reciprocal means, stored kinetic energy conversion to electric power. The various component elements of the invention include: A high-speed motor/generator, with cooperative power electronics and magnetic bearings, electronic feedback control servos to stabilize the magnetic bearings, a vertical-axis flywheel, integral with the motor/generator rotor and rotatable magnetic bearing elements, to store kinetic energy, a vacuum enclosure to reduce air drag, mechanical backup bearings that are not engaged during normal service, and a stationary energy-absorbing installation site to safely house the flywheel and its enclosure.

As also illustrated in the above-referenced United States patents, such means as rechargeable electrochemical batteries offer some usages, but encounter huge problems involving key issues such as storage space, leakage and longevity. Therefore, flywheel driven systems may offer distinct advantages over such systems. However, as flywheel power storage system designs have evolved from smaller, physically limited structures with minimal storage capacity, to the high capacity systems employing industrial sized magnetic members prevalent today, material restrictions and other such inherent factors have arisen. Said considerations must be overcome in order to facilitate reaching the maximal energy storage and output to render flywheel energy storage systems a viable alternative.

In modern applications, due to the need for extremely large magnetic arrays and magnetic members, failure of high capacity flywheel systems can be triggered by overloading and overheating of the touchdown ball bearing. When utilizing a pure electromagnet lift magnet, failure often occurs as the electrical power is tripped during normal operation due to the high lifting force requirement. As the lifting force dissipates, the heavy rotor will then sit on the ball bearings, and thus, due to the heavy load, will heat up the ball bearings in a short expanse of time. Thus, as the ball bearing fails, the high speed rotor loses the mechanical support, and rotates basically out of round, contacting the casing. Thus, wear, catastrophic at times and even explosions within the casing may occur.

Further, advanced flywheels are generally vertically mounted rotors, which are levitated by magnetic bearing systems, ether active or passive. These systems can be prone to failure due to power outage or overheating and during this type of event, the entire weight of the rotor may crash down upon and subsequently rests upon a mechanical backup bearing. Obviously, designing backup bearing systems to rectify these problems arising from power failure and/or overheating has become more challenging as flywheels become larger and operate at high speeds. Various types of mechanical bearings have been considered, designed and tested, but the extreme loads involved invariably cause the bearing to overheat, resulting in a very short life cycle and catastrophic failure.

What is needed is a backup bearing system which allows rotating systems to acquire and maintain high speeds and a high energy flywheel. What is additionally needed is a backup bearing system which can handle the full weight of the rotor upon failure, for an extended period so that no secondary damage occurs if there is a failure of the primary magnetic lift bearing.

Additionally, what is needed is a system, mechanism or method of operation, which minimizes the load on the ball bearings in the case where the rotor drops on the bearing for any potential failure mode.

SUMMARY OF THE INVENTION

The instant invention, as illustrated herein, is clearly not anticipated, rendered obvious, or even present in any of the prior art mechanisms, either alone or in any combination thereof. An auxiliary or secondary bearing system design for flywheel driven power storage system, adapted to compensate for the aforementioned drawbacks and limitations would afford significant improvement to numerous useful applications. Thus the several embodiments of the instant invention are illustrated herein.

The invention relates to an auxiliary, secondary or backup, hybrid mechanical bearings which will enhance the overall longevity of the system as the instant improvement exhibits protection and operability during power failure modes. In one embodiment, and by way of example only, a magnetic primary bearing has a secondary bearing system.

To avoid overloading and overheating of the backup mechanical bearing as the rotor drops on it, the instant invention incorporates a combination of mechanical and magnetic bearings for the backup system. The passive magnetic bearing is used to take the majority of the rotor weight (during a touchdown event) while a set of mechanical bearings provide the radial and axial positioning of the backup system. The combination of magnetic and mechanical bearings allows each to stay within its capability even at higher speeds and rotor weights.

It is an object of the instant invention to introduce a backup bearing system which allows rotating systems to acquire and maintain high speeds and high energy. It is additionally an object of the instant invention to provide a backup bearing system which can handle the full weight of a modern rotor mechanism upon the moment of power failure.

Furthermore, it is an object of the instant invention to provide a backup bearing system which can handle the full weight of a modern rotor mechanism for an extended period and thus ensure that no secondary damage occurs if there is a failure of the primary magnetic lift bearing.

It is an object of the instant invention to introduce a backup bearing system which allows flywheel systems, specifically, to acquire and maintain high speeds and high energy. It is an further object of the instant invention to introduce a system, mechanism or method of operation, which minimizes the load on the ball bearings in the case where the rotor drops on the bearing for any potential failure mode.

It is a further object of the instant invention to provide an auxiliary, secondary or backup, hybrid mechanical bearing system which will protect system components such as the stator and rotor, and surrounding support mechanisms, from wear and/or catastrophic or elastic deformation during a power failure and subsequent rotor touchdown.

Additionally, it is an object of the instant invention to introduce a secondary bearing system which will allows a flywheel to maintain power generation through continued rotation upon a failure.

It is an additional objective of the instant invention to provide a flywheel power storage system possessing a motor/generator with minimal eddy current losses which displays use of mechanical bearings only as temporary backup as a rotor integral primary magnetically driven primary bearing system relieves wear on the mechanical bearings.

Further, as in any flywheel driven system, general objectives of this invention are to provide improved long-life flywheel batteries without sizable power losses, excessive internal heating, vacuum loss, extensive maintenance, explosion hazard and high cost.

It is an added objective of the instant invention to prevent the high speed rotor from becoming affixed to the stator due to extreme force and heat considerations experienced under any potential failure mode.

Another objective is to eliminate need for lubricants in mechanical backup bearings, to remove a cause of vacuum loss, frequent maintenance, and mechanical bearing failures. It is a further object of the instant invention to introduce a device which utilizes a combination of proven technologies, in order to achieve the above stated goals and thus operate at high loads and high speeds and resist overheating.

The instant hybrid touchdown bearing is a hybrid as the system provides static bearing weight support upon failure, but also allows the flywheel to continue rotation, thus continuing power generation and minimizing power loss.

Accordingly, an improved flywheel battery system and accompanying enhancements its component elements are herein described, which achieve these objectives, plus other advantages and enhancements. These improvements to the art will be apparent from the following description of the invention when considered in conjunction with the accompanying drawings wherein there has thus been outlined, rather broadly, the more important features of the system in order that the detailed description thereof that follows may be better understood, and in order that the present contribution to the art may be better appreciated.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. Other features and advantages of the present invention will become apparent from the following description of the preferred embodiment(s), taken in conjunction with the accompanying drawings, which illustrate, by way of example, the principles of the invention.

A secondary touchdown bearing system is disclosed, for a flywheel power storage and release system. The secondary touchdown bearing system comprises a pair of mechanical bearings annularly disposed around the touchdown rotor shaft. The secondary touchdown bearing system further comprises a stator assembly comprising a static housing, an annular passive attractive permanent magnetic bearing, a rotating disk disposed to rotate at a controlled gap in relation to the stator assembly, and an interface mechanism disposed between a flywheel rotor shaft and the touchdown rotor shaft. In one aspect, the pair of mechanical bearings comprises angular contact bearings. In another aspect, the annular passive attractive permanent magnet is used to take the majority of the rotor weight during a touchdown event. In yet another aspect, the set of mechanical bearings provides radial and axial positioning of the backup touchdown bearing system. In a further aspect, a combination of magnetic and mechanical bearings allows the magnetic and mechanical bearings to stay within respective capabilities at higher speeds and rotor weights.

In one embodiment, the flywheel power storage and release system includes an upper radial bearing, an axial lift bearing, a lower radial bearing and a lower touchdown bearing system. In one aspect of this embodiment, the lower touchdown bearing system comprises a touchdown rotor shaft; a pair of bearings annularly positioned around the touchdown rotor shaft; a stator assembly comprising a static housing comprising an annular passive attractive permanent magnet; a rotating disk; and, an interface mechanism disposed between a flywheel rotor shaft and the touchdown rotor shaft. In another aspect, the pair of bearings annularly positioned around the touchdown rotor shaft comprises angular contact bearings. In another aspect, the rotating disk is disposed to rotate at a controlled gap in relation to the stator assembly.

In another embodiment, a flywheel driven power storage system comprises a motor/generator means; a flywheel rim in communication with a vertical-axis spindle in communication with a rotor mechanism; a magnet ring assembly; a stator housing; a magnet array for providing axial flux; a coil mechanism; and, a set of bearing mechanisms. Upon actuation of the system, the attraction of the rotor mechanism to the magnet ring lifts the vertical-axis spindle, which lifts the flywheel rim off of the set of bearing mechanisms, allowing the flywheel rim to operate substantially independent of set of bearing mechanisms. A lower touchdown bearing system is disposed to support the weight of the flywheel rim and continue rotation of the flywheel rim upon failure and touchdown of the flywheel rim. In one aspect of this embodiment, the lower touchdown bearing system comprises: a touchdown rotor shaft; at least one angular contact bearing annularly positioned around the touchdown rotor shaft; a stator assembly comprising a static housing comprising an annular passive attractive permanent magnet; a rotating disk disposed to rotate at a controlled gap in relation to the stator assembly; and, an interface mechanism disposed between a flywheel rotor shaft and the touchdown rotor shaft. In another aspect, the angular contact bearing further comprises a pair of angular contact bearings annularly positioned around the touchdown rotor shaft and disposed one bearing axially above the other in relation to the touchdown rotor shaft. In yet another aspect, a combination of a annular passive attractive permanent magnet and the pair of angular contact bearings, as part of the secondary touchdown bearing system, produces a hybrid system exhibiting the strength and speed capacities greater than existing mechanical bearings operating in a vacuum. In still another aspect, the passive magnetic bearing absorbs the majority of the rotor weight during a power failure, the set of mechanical bearings provides radial and axial positioning of the touchdown bearing system, and the combination of the passive magnetic bearing and the set of mechanical bearings allows the flywheel driven power system to operate at higher speeds than systems employing purely mechanical backup bearings. In a further aspect, utilization of the combination of the passive magnetic bearing and the set of mechanical bearings allows the flywheel driven power system to support greater rotor weights than systems employing purely mechanical backup bearings.

In yet another embodiment, a secondary bearing system comprises: a primary system shaft, an auxiliary rotor shaft, an interface mechanism disposed between the primary system shaft and the auxiliary rotor shaft, a first bearing annularly disposed about the auxiliary rotor shaft; a second bearing annularly disposed about the auxiliary rotor shaft and arranged axially juxtaposition to the first angular contact bearing in relation to the auxiliary rotor shaft; a stator assembly comprising a static housing and further comprising an annular passive attractive permanent magnet, and a rotating disk disposed to rotate at a controlled gap in relation to the stator assembly. In one aspect of this embodiment, the secondary bearing system encompases the capacity to support the full weight of a flywheel mechanism upon loss of power. In another aspect, the secondary bearing system encompasses the capacity to support the full weight of a flywheel mechanism upon loss of power and allow the flywheel to rotate. In yet another aspect, the secondary bearing system encompasses the capacity to support the full weight of a flywheel mechanism upon loss of power and allow the flywheel to rotate for an extended period of time. In a further aspect, the secondary bearing system encompasses the capacity to support the full weight of a flywheel mechanism upon loss of power and operates in a vacuum at high loads, high speeds without overheating. In still another aspect, the primary system shaft and the auxiliary rotor shaft are adapted to rotate at high speed with respect to one another while withstanding contact with one another through the interface mechanism disposed between the primary system shaft and the auxiliary rotor shaft. In another aspect, the first bearing annularly disposed about the auxiliary rotor shaft and the second bearing annularly disposed about the auxiliary rotor shaft comprise angular contact bearings. In another aspect, the first bearing annularly disposed about the auxiliary rotor shaft and the second bearing annularly disposed about the auxiliary rotor shaft comprise duplex ball bearings. In another aspect, the first bearing annularly disposed about the auxiliary rotor shaft and the second bearing annularly disposed about the auxiliary rotor shaft comprise tapered roller bearings. In another aspect, the first bearing annularly disposed about the auxiliary rotor shaft and the second bearing annularly disposed about the auxiliary rotor shaft comprise hydrodynamic bearings.

BRIEF DESRIPTION OF THE DRAWINGS

Figure 2A:
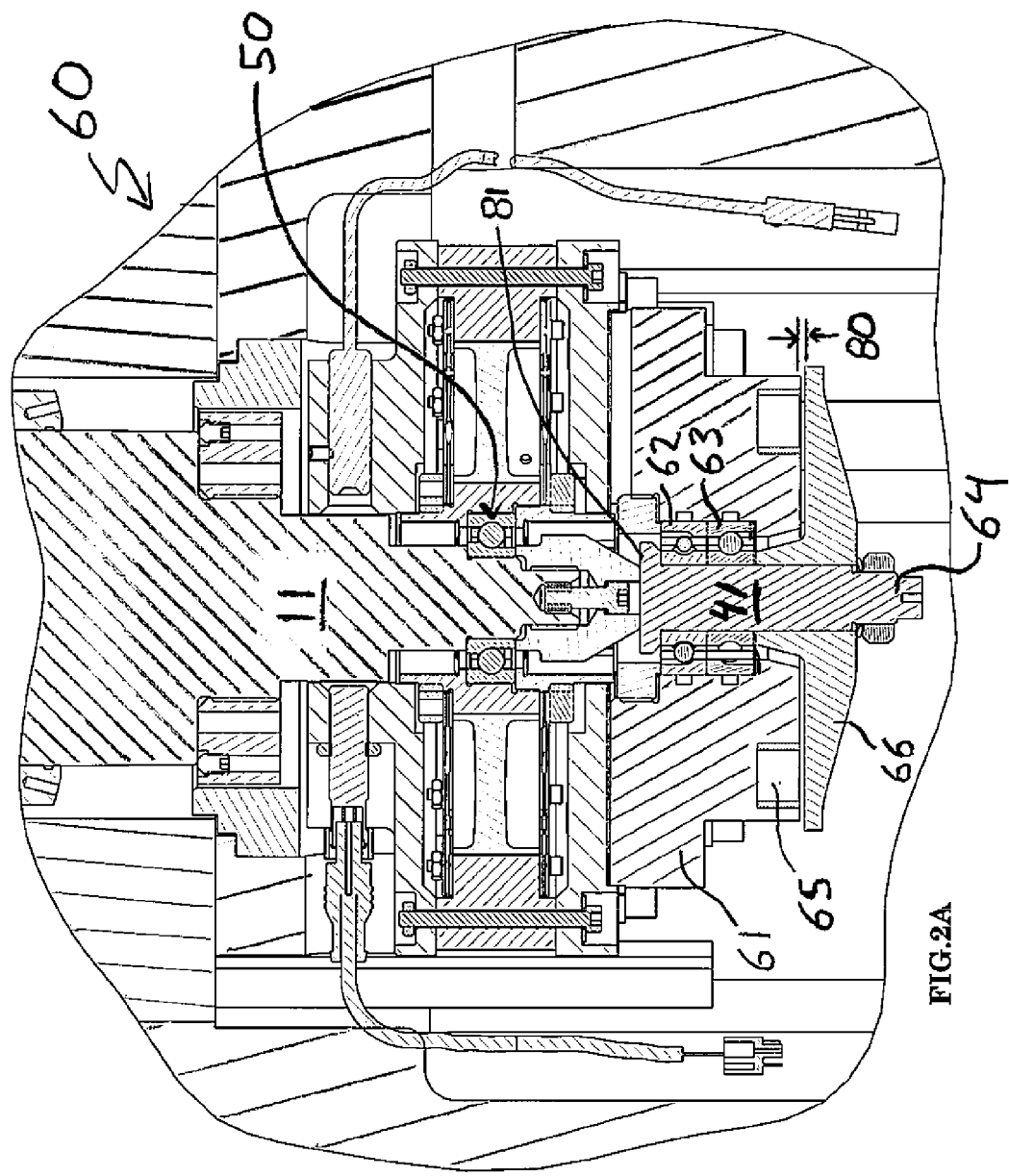

FIG. 1 illustrates a diagrammatic cross-sectional view, in elevation, of flywheel power storage system and particularly illustrates the location and coaction of the instant secondary bearing system when utilized in a flywheel power storage system; and FIG. 2A illustrates a diagrammatic cross sectional view, in elevation, of the instant secondary or auxiliary bearing system as utilized in a fault mode of operation of a flywheel power storage system.

Figure 2B:
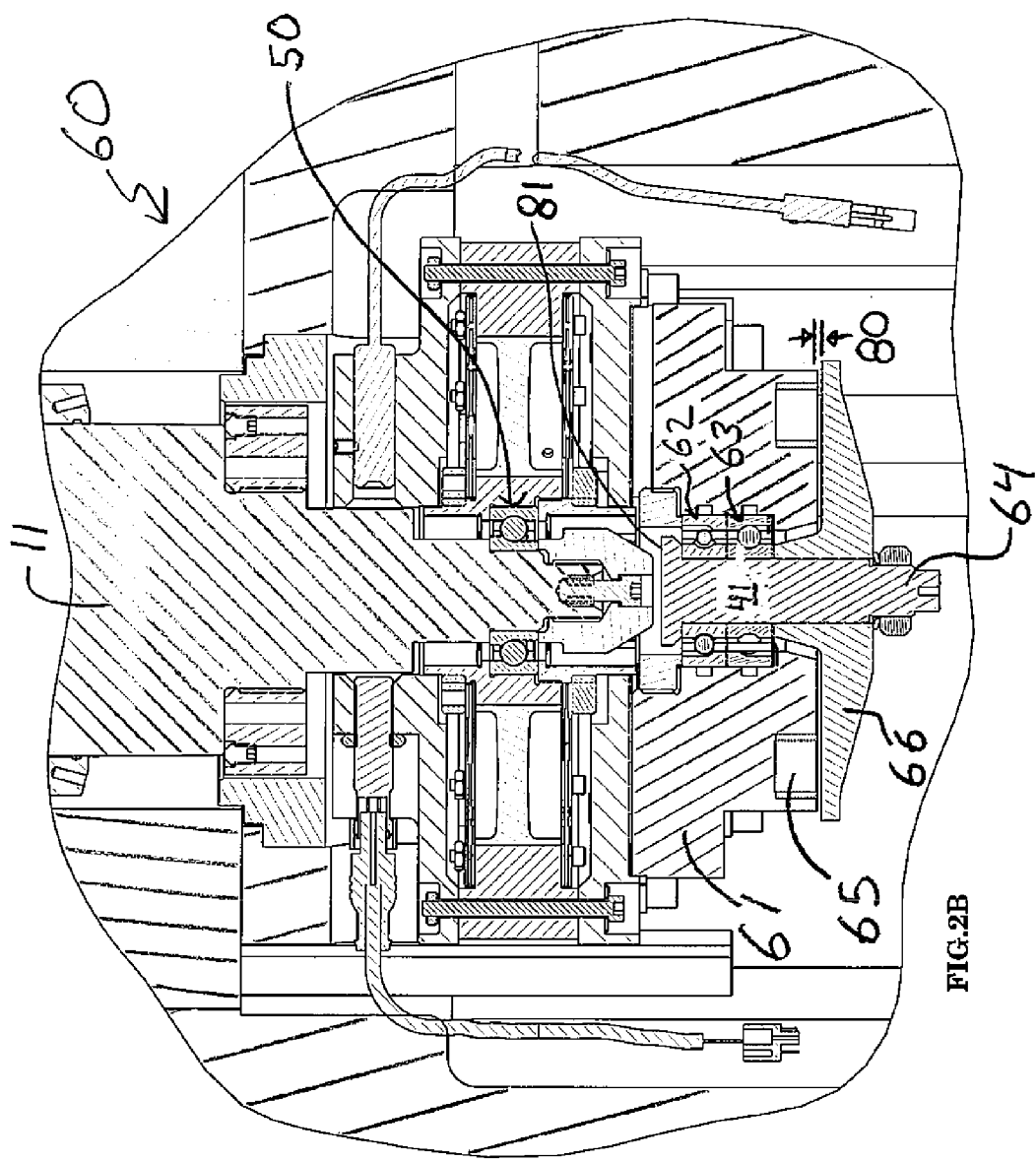

FIG. 2B illustrates a diagrammatic cross-sectional view, in elevation, of the instant secondary or auxiliary bearing system as utilized in a normal mode of operation of a flywheel power storage system.

DETAILED DESCRIPTION OF THE SEVERAL EMBODIMENTS

The detailed description set forth below in connection with the appended drawings is intended as a description of presently-preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as flywheel systems with magnetic bearings used in a variety of applications.

In flywheel driven power storage systems, as well as in many other applications which involve shafts and other implements rotating at high revolutions per minute, bearing overheating or power failure can create catastrophic damage to system components. In the past, through experimentation, various types of mechanical bearings have been considered and duly tested, but the large loads consistently cause the bearing to overheat, resulting in a very short life and eventual failure.

Therefore, the consistent system failure and component damage demands for the development of an ancillary or secondary bearing system, designed to protect and augment the standard primary bearing system during normal operation and additionally provide a means to continue operation and protect system components in the power failure situations. The instant system thus remedies the above discussed troubles exhibited in modern systems.

The salient objectives of the instant invention center around improvement of high capacity, flywheel energy storage systems and particularly around improvement upon inherent bearing wear and damage upon touchdown of a main system rotor. Thus, creation of a system, subsystem, mechanism or method of operation which minimizes the load on the ball bearings, in the case where the high speed rotor should release and begin to plummet down on the ball bearings during potential failure mode, is crucial. The proposed hybrid touchdown bearing system 60 is shown at the bottom of the flywheel in FIG. 1 and in more detail in FIG. 2.

FIG. 1 depicts a cross-section of a typical vertically mounted flywheel system for larger applications. The key elements of said system can be summarized as the flywheel static structure 10, top bearings 20, axial magnetic lift bearing 30, flywheel rotor 40, and the bottom radial bearing 50. Typical systems would possess all of the static hardware, rotor, axial magnetic lift and some version of top and bottom radial bearings. Thus, typical flywheels possess each of these components, except the proposed secondary or auxiliary touchdown bearing system as introduced herein as the hybrid touchdown bearing system 60.

The specific components included in the instant hybrid secondary or auxiliary hybrid touchdown bearing 60 are illustrated in FIGS. 2A and 2B. FIG. 2A exhibits the flywheel shaft 11, dropped into contact with a mechanical interface 81 of the secondary rotor 41. The elements making up the auxiliary or secondary hybrid touchdown are illustrated including the auxiliary or secondary static housing 61 the auxiliary or secondary touchdown mechanical bearings 62, 63, a touchdown shaft 64, a static housing 61 with a passive attractive permanent magnet 65 and rotating disk 66 and a gap 80 between permanent magnet 65 and rotating disk 66. The touchdown mechanical bearings 62, 63 may be a pair of angular contact bearings. FIG. 2B exhibits the flywheel shaft 11, spinning in a normal mode of operation with the shaft and the interface in a spaced apart relationship between the shaft and the interface.

In differing embodiments of the instant hybrid system, the bottom radial bearing 50 may be configured as a mechanical bearing used in the event of an axial lift failure to support the rotor weight. If the radial bearings are magnetic, then a separate mechanical bearing would be added to support the rotor weight in the event of an axial lift failure. In either of these cases, a mechanical bearing would support the rotor weight in the event of an axial lift failure. However, as the flywheel designs become larger and the rotor weight analogously gets heavier, the load will exceed the capability of this mechanical bearing.

Various mechanical bearings including angular contact, duplex ball bearings, tapered roller bearings and hydrodynamic bearings have been used or considered for use on an individual basis. However, each of these has a limited load capability. This capability of each of these types of bearings incrementally reduces as the rotor speed is increased, such as in the case of utilization of advanced high energy density flywheels.

Moreover, the addition of the passive attractive permanent magnet 65 and rotating disk 66 represent additional novelty, which clearly departs from typical touchdown bearing configurations. In past operation, the mechanical bearings would, as stated above, possess a limited load capability, particularly in high-speed applications. During normal operation of the instant invention, which encompasses utilization of a functioning lift bearing, the touchdown shaft and bearings would be stationary and only encounter the small preload between bearings. How, once a failure of the lift magnet occurs, the flywheel rotor would drop to the touchdown shaft, accelerating the shaft to the identical speed as the flywheel shaft and additionally transferring the weight of the rotor to the touchdown system. In the case where only the mechanical bearings are incorporated, this load would overheat the bearings, thus causing failure in a matter of minutes.

Presently, with the addition of the magnetic bearing system, the load on the mechanical bearings is reduced. Within the instant system, the rotor and bearings would be stationary during normal operation, which includes a functioning lift bearing. The addition of the magnetic bearing would actually increase the load upon these bearings during this mode, as in past configurations the shaft would not be rotating.

However, unlike in past designs, the instant bearings can handle very large static loads. Herein, when an axial lift bearing fails, the touchdown shaft contained in the instant invention again accelerates up to the flywheel speed and transfers load to the touchdown bearings. Thus, in the instant invention, the load counteracts the touchdown magnet forces and the mechanical bearings only experience the difference between the flywheel rotor weight and the magnetic bearing force. Furthermore, with proper selection of component size, this difference approaches negligible, thus leaving only a small load for the mechanical bearings. And, because the magnet does not generate significant heat, this system supports the load without causing the mechanical bearings to overheat.

The proposed configuration utilizing a combination of magnetic and mechanical bearings is unique. Functionally the system can handle higher rotor loads than a mechanical bearing alone. This allows acceptable failure modes for flywheels comprising higher rotor weights and rotating at greater revolutions. Magnetic bearings are typically used for the main rotor support and mechanical bearings are added for the case of a failed magnetic bearing. Prior to the inception of the design herein claimed, the concept of using a hybrid bearing for touchdown has yet to be perfected. Lower load on the mechanical bearings will allow the other bearings to sustain higher loads for a longer time and avoid overheating during the rotor spinning down.

By adding the magnetic bearing the load on the mechanical bearings is reduced. As with the system in the above paragraph the rotor and bearings would be stationary during normal operation with a functioning lift bearing. The added magnetic bearing would actually add load to these bearings during this mode were the shaft is not rotating; however the bearings can handle very large static loads. When an axial lift bearing fails the touchdown shaft again accelerates up to the flywheel speed and transfers load to the touchdown bearings.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A secondary touchdown bearing system for use with a flywheel system, said flywheel system including (i) a flywheel rotor arrangement having a rotor weight and including a flywheel shaft that defines an axis of rotation that is aligned at least approximately in a vertical orientation, (ii) a flywheel stator arrangement, and (iii) a primary magnetic lift bearing, supported by said flywheel stator arrangement, and said primary magnetic lift bearing is configured to levitate said flywheel rotor arrangement, and said flywheel shaft defines a lower surface that faces downward at least generally normal to said axis of rotation, said secondary touchdown bearing system comprising:

at least one touchdown mechanical bearing, supported by said flywheel stator arrangement, defining a secondary axis of rotation that is at least approximately aligned with the axis of rotation of the flywheel;

a touchdown rotor, supported by said touchdown mechanical bearing such that said touchdown rotor is rotatable around said secondary axis of rotation, said touchdown rotor having a touchdown interface that is positioned to face upward in a confronting relationship with said lower surface of said flywheel shaft, and said touchdown rotor includes an annular rotor region that at least generally defines an annular rotor surface;

an annular stator region that is supported by said flywheel stator and at least generally defines an annular stator surface that is oriented in a confronting relationship with said annular rotor surface for defining an axial gap therebetween;

and said annular rotor region and said annular stator region are configured to cooperate with one another, to form a touchdown magnetic bearing arrangement, for producing a magnetic field across said axial gap to cause an upward magnetic force, for application to said touchdown rotor, that is transferred through said touchdown rotor to said touchdown mechanical bearing, and said secondary touchdown bearing system is configured for selective operation in either one of a normal mode and a fault mode, and in said normal mode of operation, said flywheel rotor arrangement rotates at high speed and is sufficiently levitated, by said primary magnetic lift bearing, to maintain a spaced apart relationship between said touchdown interface and said lower surface of said flywheel shaft, such that said flywheel rotor arrangement contributes no load to said touchdown mechanical bearing, and said touchdown rotor remains rotationally stationary with respect to said flywheel stator, and in said fault mode of operation, said flywheel arrangement is insufficiently levitated for maintaining said normal mode of operation, and said flywheel rotor arrangement drops such that said lower surface of said flywheel shaft contacts said touchdown interface to cause the touchdown rotor to accelerate, responsive to said contact, to at least approximately the speed of the flywheel rotor arrangement, and at least a portion of said rotor weight is supported by said touchdown interface to cause a downward force on said touchdown mechanical bearing, wherein in said fault mode of operation, said downward force and said upward magnetic force counteract one another to cause an axial bearing load on said touchdown mechanical bearing, that is reduced as compared to a different axial bearing load that would be applied, to said touchdown mechanical bearing, in an absence of said upward magnetic force.

2. The secondary touchdown bearing system of claim 1 wherein said touchdown magnetic bearing and said touchdown rotor are configured to cooperate with one another such that (i) in the normal mode of operation the upward magnetic force on the touchdown mechanical bearing at least contributes to a static bearing load on said touchdown mechanical bearing, and (ii) the static bearing load is greater than said axial bearing load on the touchdown mechanical bearing in the fault mode of operation, such that any transition between the normal mode of operation and the fault mode causes a decrease in the bearing load on the touchdown mechanical bearing.

3. The secondary touchdown bearing system of claim 1 wherein said touchdown mechanical bearing exhibits a static load capability and a high speed load capability, and said high speed load capability decreases as rotational speed of the bearing increases, such that the high speed load capability is less than the static load capability, and said touchdown mechanical bearing and said touchdown magnetic bearing arrangement are configured to cooperate with one another such that for said operation in said normal mode, said upward magnetic force, exerted on said touchdown mechanical bearing by said touchdown magnetic bearing arrangement, is less than said static load capability, and said upward magnetic force exceeds said high speed load capability.

4. The secondary touchdown bearing system of claim 3 wherein said touchdown mechanical bearing and said touchdown magnetic bearing arrangement are configured to cooperate with one another such that for operation at high speed, in said fault mode, said upward magnetic force and said downward force counteract one another to a degree that is sufficient to cause said axial bearing load in said fault mode to be substantially lower than said upward magnetic force to maintain the axial bearing load at or below said high speed load capability.

5. The secondary touchdown bearing system of claim 3 wherein said annular stator region includes a permanent magnet that is positioned above and axially aligned with said annular rotor region of said touchdown rotor assembly, and said annular rotor region is composed of a magnetic material, and said permanent magnet and said magnetic material are configured to cooperate with one another for producing said magnetic field.

6. The secondary touchdown system of claim 4 wherein said upward magnetic force counteracts the downward force to a degree that is sufficient to reduce heating of said touchdown mechanical bearing as compared to a different amount of heating that would be applied, to said touchdown mechanical bearing, in an absence of said upward magnetic force.

7. A method for producing a secondary touchdown bearing system, for use with a flywheel system, said flywheel system including (i) a flywheel rotor arrangement having a rotor weight and including a flywheel shaft that defines an axis of rotation that is aligned at least approximately in a vertical orientation, (ii) a flywheel stator arrangement, and (iii) a primary magnetic lift bearing, supported by said flywheel stator arrangement, and said primary magnetic lift bearing is configured to levitate said flywheel rotor arrangement, and said flywheel shaft defines a lower surface that faces downward at least generally normal to said axis of rotation, said method comprising:

supporting a touchdown mechanical bearing, using said flywheel stator arrangement, to define a secondary axis of rotation that is at least approximately aligned with the axis of rotation of the flywheel;

arranging a touchdown rotor, supported by said touchdown mechanical bearing such that said touchdown rotor is rotatable around said secondary axis of rotation, said touchdown rotor having a touchdown interface, and positioning the touchdown interface to face upward in a confronting relationship with said lower surface of said flywheel shaft, and said touchdown rotor includes an annular rotor region that at least generally defines an annular rotor surface;

configuring an annular stator region as part of said flywheel stator, having an annular stator surface that is oriented in a confronting relationship with said annular rotor surface to define an axial gap therebetween and further configuring said annular rotor region and said annular stator region to cooperate with one another, to form a touchdown magnetic bearing arrangement, for producing a magnetic field across said axial gap to cause an upward magnetic force, for application to said touchdown rotor, that is transferred through said touchdown rotor to said touchdown mechanical bearing, and further configuring said secondary touchdown bearing system for operation in either one of a normal mode and a fault mode, and in said normal mode of operation, activating said primary magnetic lift bearing for levitating said flywheel rotor arrangement sufficiently to maintain a spaced apart relationship between said touchdown interface and said lower surface of said flywheel shaft, such that said flywheel rotor arrangement contributes no load to said touchdown mechanical bearing, and said touchdown rotor remains rotationally stationary with respect to said flywheel stator, and in said fault mode of operation, allowing said flywheel rotor arrangement to drop such that said lower surface of said flywheel shaft contacts said touchdown interface to cause the touchdown rotor to accelerate, responsive to said contact, to at least approximately the speed of the flywheel rotor arrangement, and supporting at least a portion of said rotor weight, by said touchdown interface, to cause a downward force on said touchdown mechanical bearing, wherein in said fault mode of operation, said downward force and said upward magnetic force counteract one another to cause an axial bearing load on said touchdown mechanical bearing, that is reduced as compared to a different axial bearing load that would be applied, to said touchdown mechanical bearing, in an absence of said upward magnetic force.

* * * * *